May 9, 1972   L. C. HARLOW ET AL   3,662,051
AUTOMATIC RECORD MOLDING APPARATUS AND METHOD
Filed Feb. 25, 1969   7 Sheets-Sheet 3
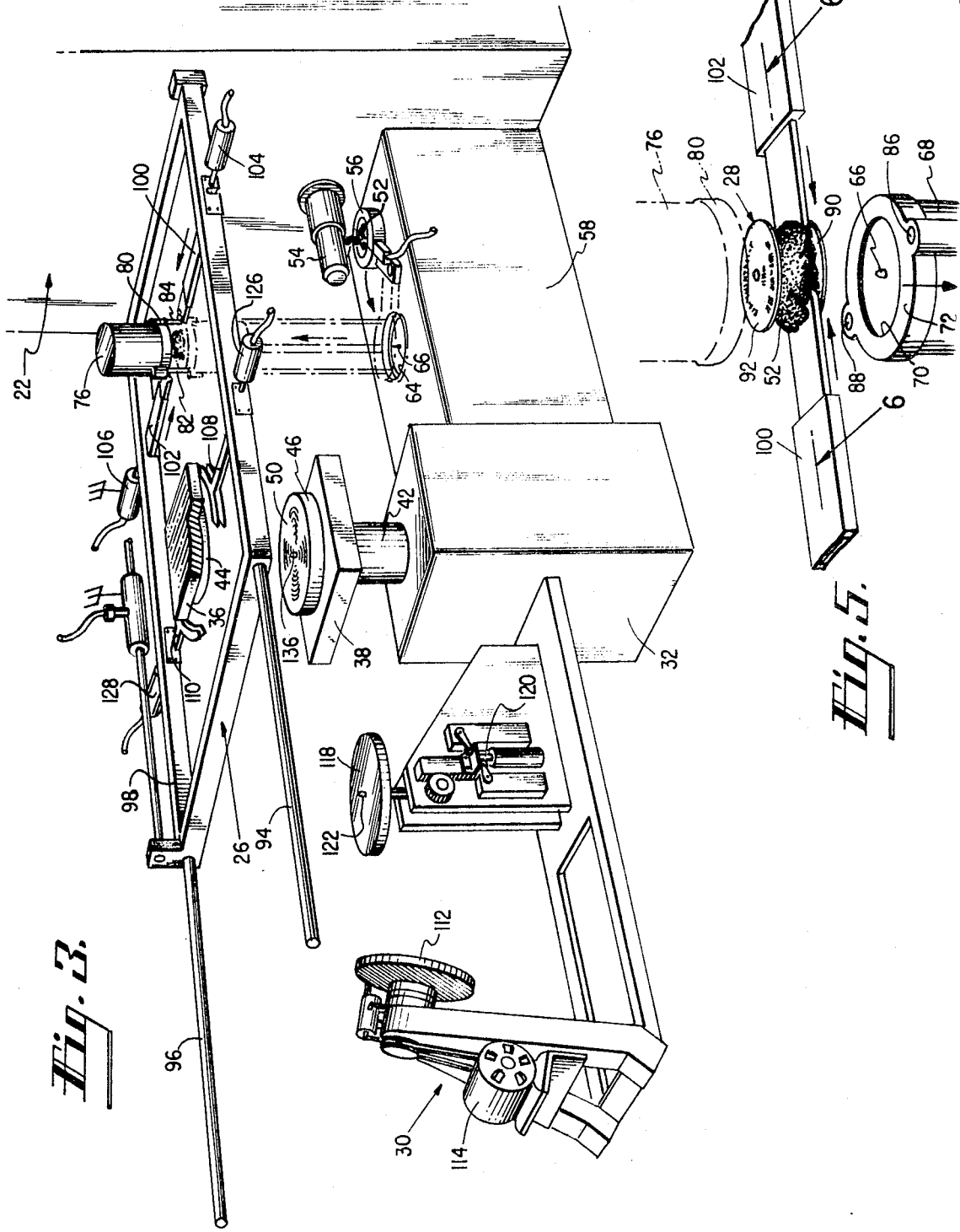
INVENTORS
Loraine C. Harlow,
Stephen D. Ransburg,
and Lester L. Mehaffey.
BY
ATTORNEY

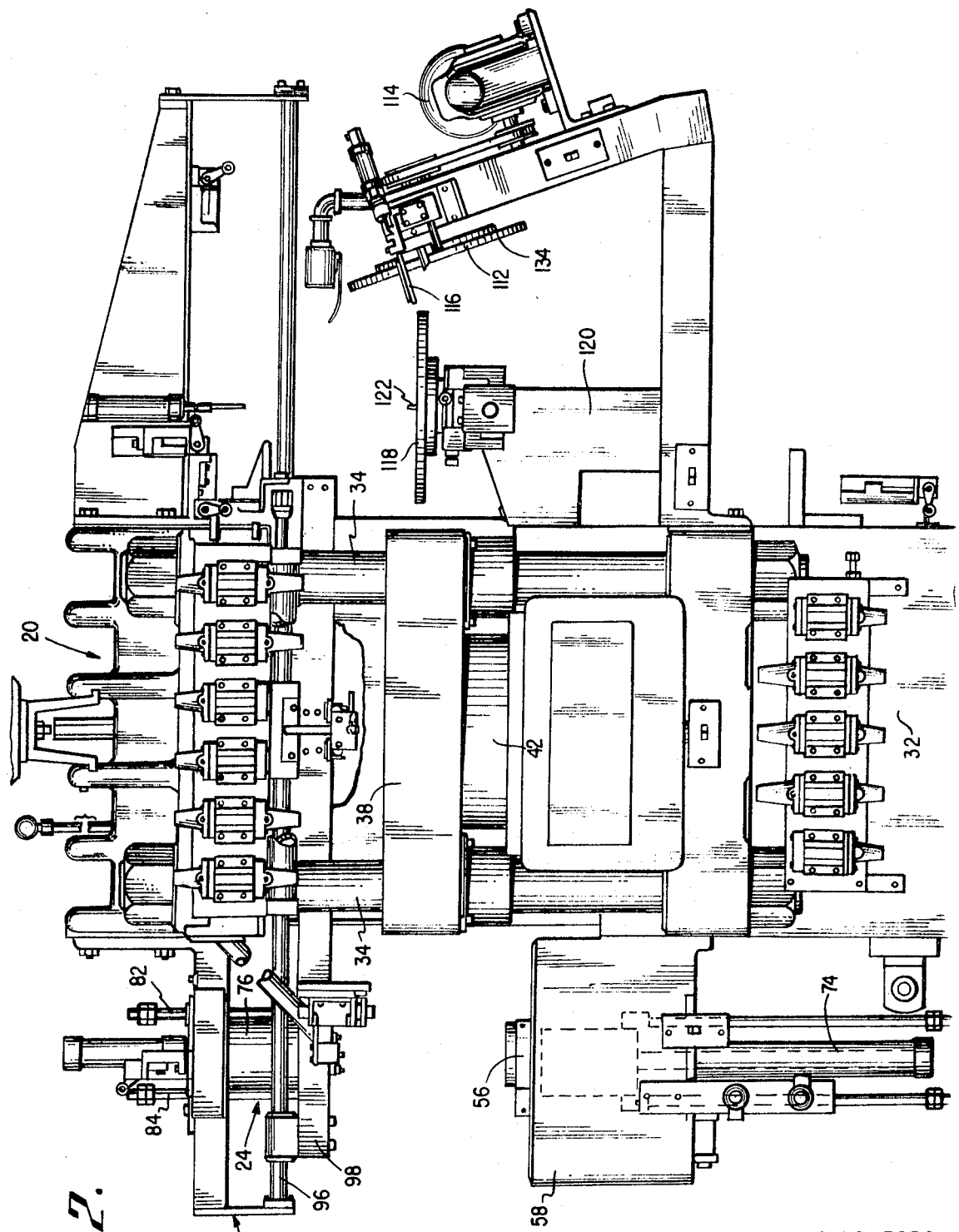

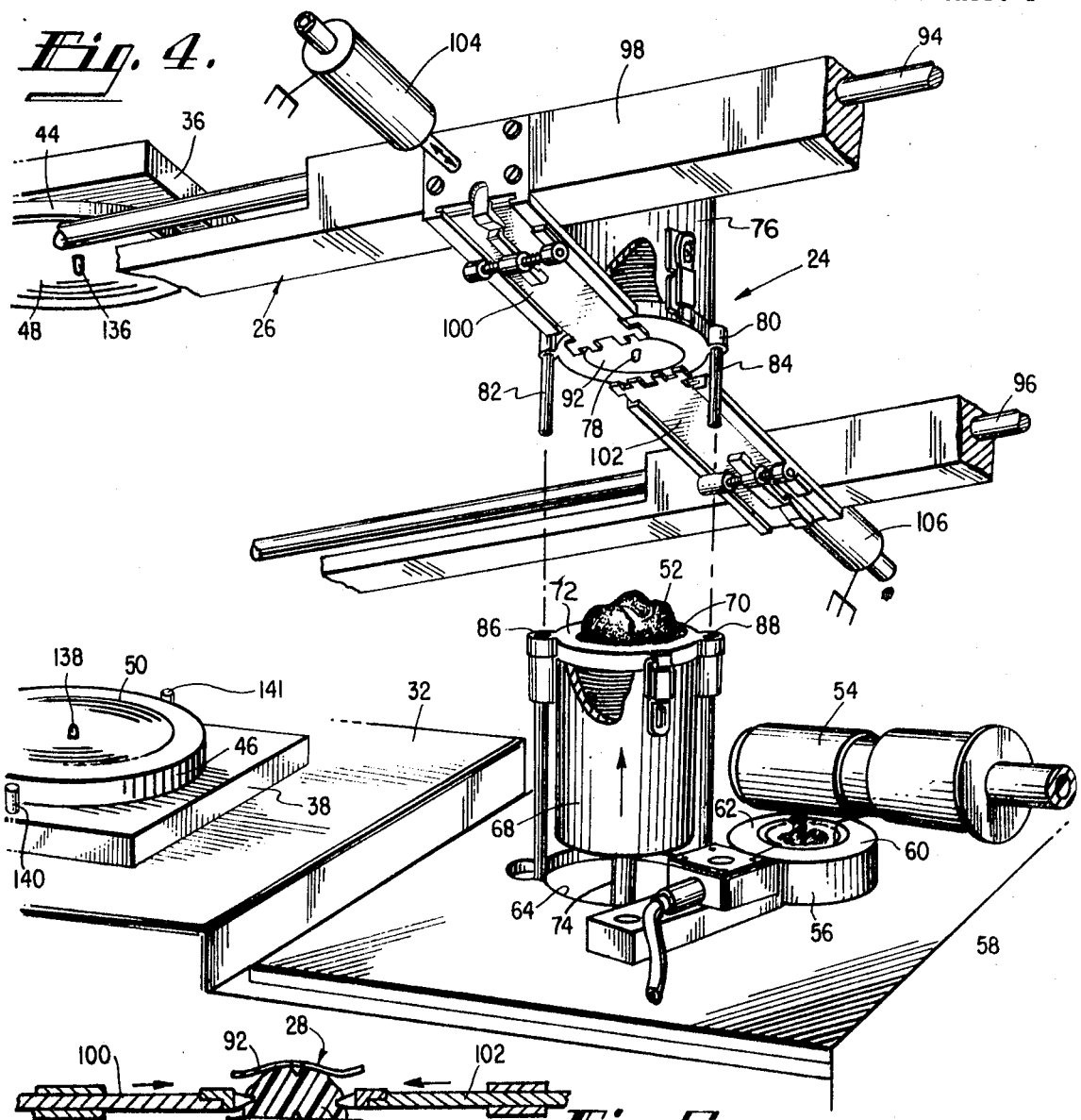

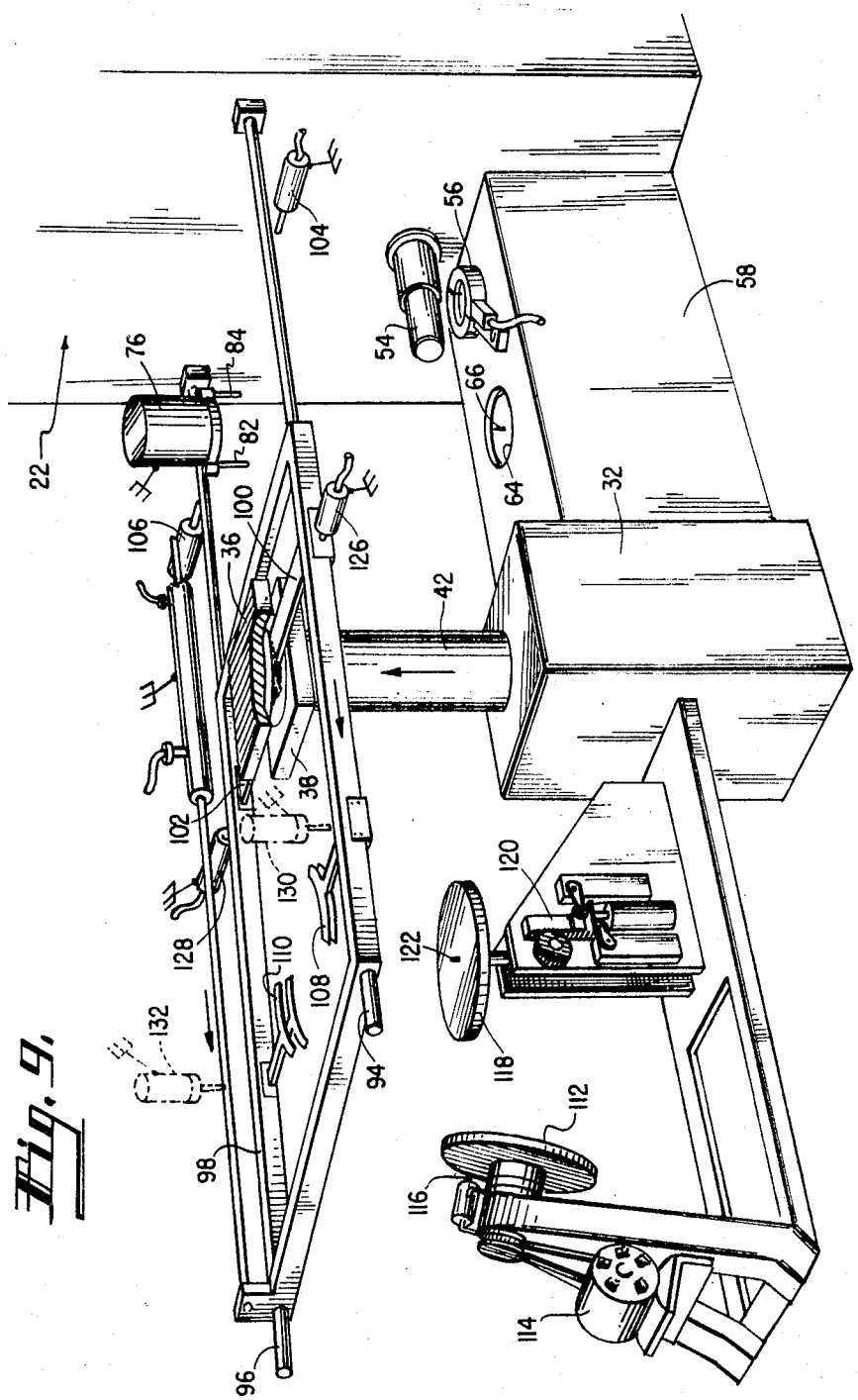

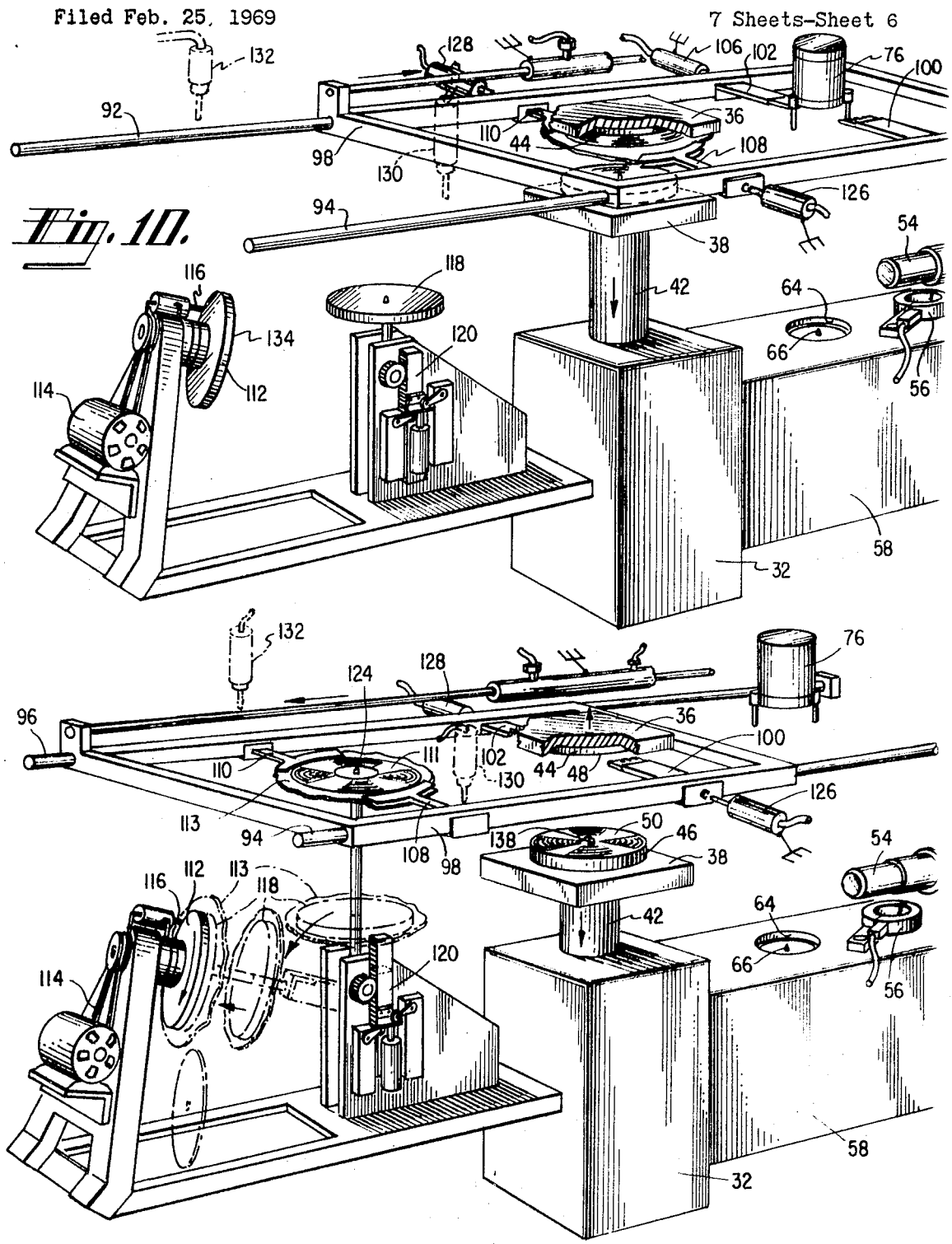

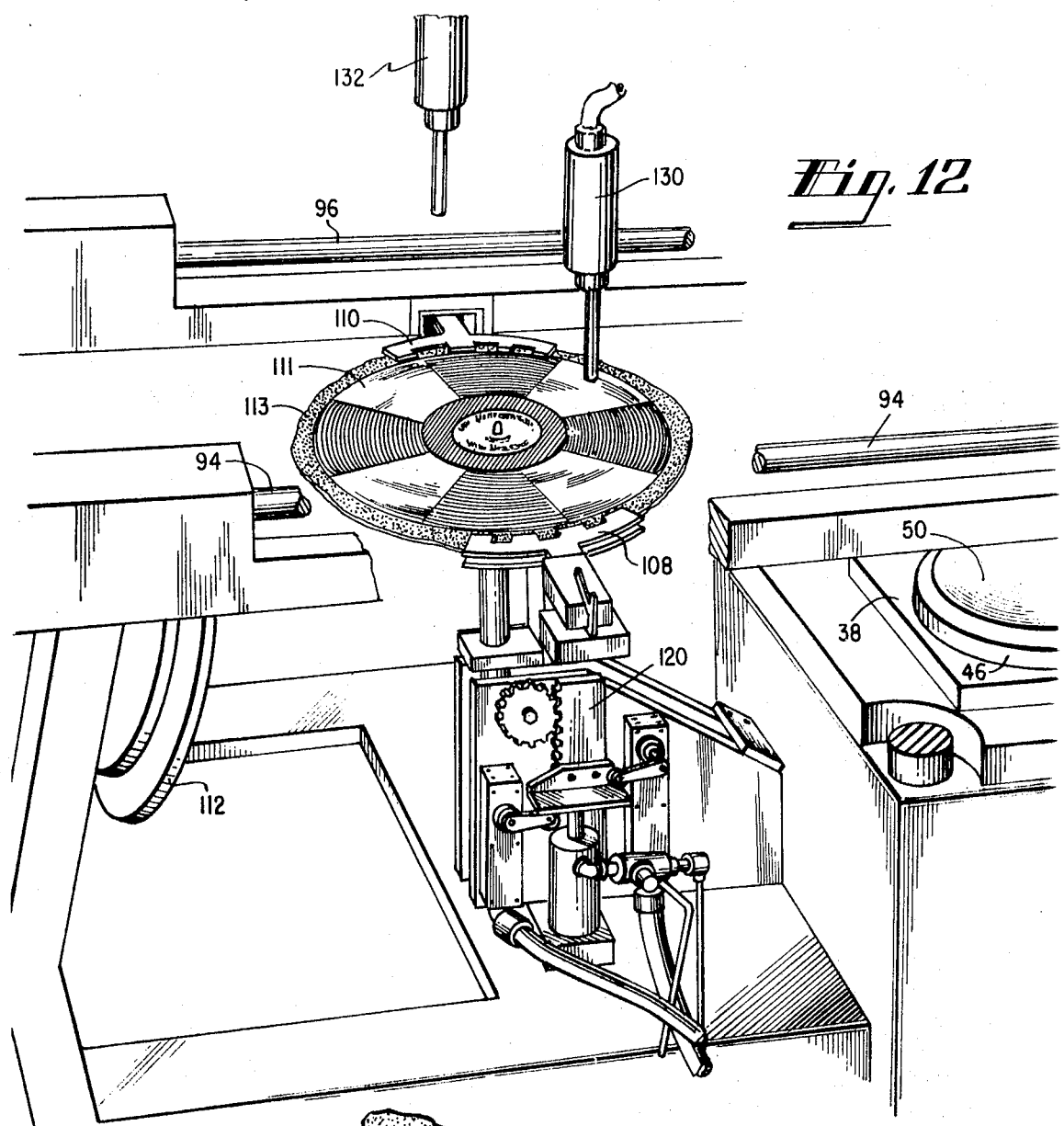
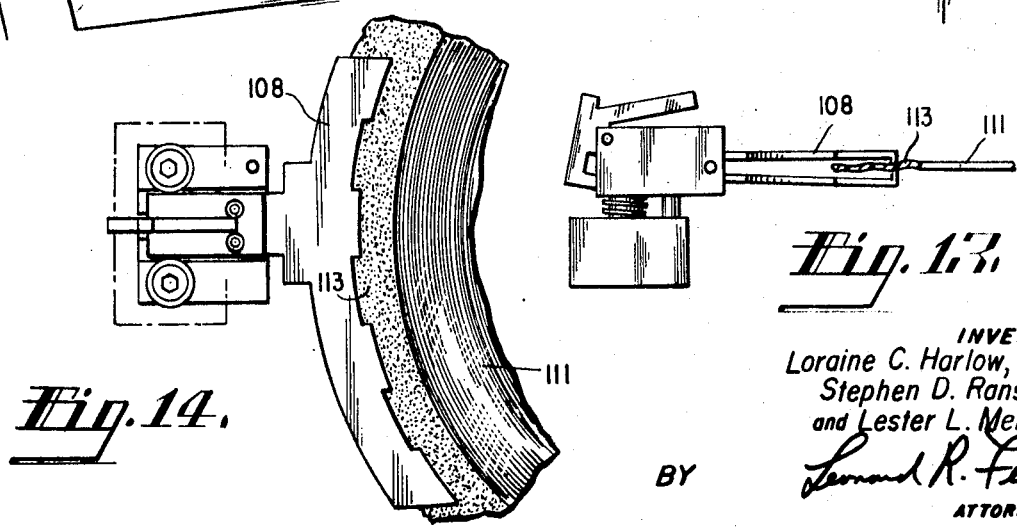

United States Patent Office 3,662,051
Patented May 9, 1972

3,662,051
AUTOMATIC RECORD MOLDING APPARATUS AND METHOD
Loraine C. Harlow, Greenfield, and Stephen D. Ransburg and Lester L. Mehaffey, Indianapolis, Ind., assignors to RCA Corporation
Filed Feb. 25, 1969, Ser. No. 801,972
Int. Cl. B29d 17/00
U.S. Cl. 264—107         17 Claims

ABSTRACT OF THE DISCLOSURE

An automatic record press apparatus includes means for assembling for transport to the molding press portion of the apparatus, a sandwich arrangement consisting of a quantity of moldable material having adhered thereto on opposing surface areas, top and bottom record labels.

---

This invention relates to record molding apparatus and more particularly to an automatic phonograph record press.

The trend in the record manufacturing industry has been steadily in the direction of the production of phonograph records by completely automated means. The desired objectives for this change-over are, of course, increased manufacturing efficiency and lower production costs. Achievement of these objectives, however, is not without problems. In particular, is the elimination or minimization of lost and wasted motions during the various operations performed by the automated press apparatus. Controlling in this area and bearing directly on the press cycling rate, and therefore the production output of the press, is the time that the press remains open to receive the moldable material or preform, and the manner in which the preform and title lables are transported to the molding cavity as well as the stamping or pressing time and manner in which a stamped record is ejected from the cavity and processed through further finishing operations.

It is an object of the present invention to provide an improved automatic record press apparatus which accomplishes the aforementioned objectives.

It is another object of the present invention to provide an automatic record press having means for transporting a preform and associated title labels to the molding cavity in a simple and efficient manner.

In accordance with the present invention, means are provided for assembling for transport to a molding press, a sandwich arrangement consisting of a quantity of moldable material or preform having adhered thereto on opposing surface areas and in axial alignment, top and bottom record labels. Means are provided for thereafter engaging the moldable material and then transporting the material and label sandwich to the molding press for molding a record disc therefrom.

FIG. 2 is a left-hand side elevation view of the press apparatus shown in FIG. 1 with the platens in a partially open position to receive a preform-label sandwich;

FIG. 3 is a diagrammatic perspective partial view of the press apparatus taken at substantially the same angle as that of FIG. 1 and illustrating in particular the preform cup and label loader operating mechanism;

FIG. 4 is a perspective view taken from the right-hand view of FIG. 1 and showing in detail the preform cup and label loader mechanism;

FIG. 5 is a partial view in perspective showing the gripping members associated with the label loader mechanism in engaging contact with a preform having the title labels adhering to its upper and lower surfaces thereof;

FIG. 6 is a longitudinal cross-sectional view of the gripping members associated with the label loader mechanism engaging the preform-label sandwich and taken on lines 6—6 of FIG. 5;

FIG. 7 is a top view of one of the preform gripping members shown in FIG. 5;

FIG. 8 is an elevation view in cross-section of the gripping member shown in FIG. 7 and taken along the lines 8—8 thereof;

FIG. 9 is a diagrammatic partial view of the press apparatus and illustrating in particular the carriage transfer of the preform-label sandwich into the press molding cavity between the upper and lower platen stamping members;

FIG. 10 is a diagrammatic perspective partial view of the press apparatus and illustrating in particular the transfer carriages gripping members in engagement with the flash portion of a pressed record still between the platen stamping members and ready to be transported to the flash removing mechanism;

FIG. 11 is a diagrammatic partial view of the press apparatus and illustrating in particular the outer carriage transfer, record edger, and flash remover operating mechanism;

FIG. 12 is a perspective partial view showing in detail the flash gripping mechanism associated with the press apparatus;

FIG. 13 is a side elevation view of one of the flash gripping members shown in FIG. 12 and in contact with a flash portion of the record; and FIG. 14 is a top view of the gripping members shown in FIG. 13.

Figure 1:
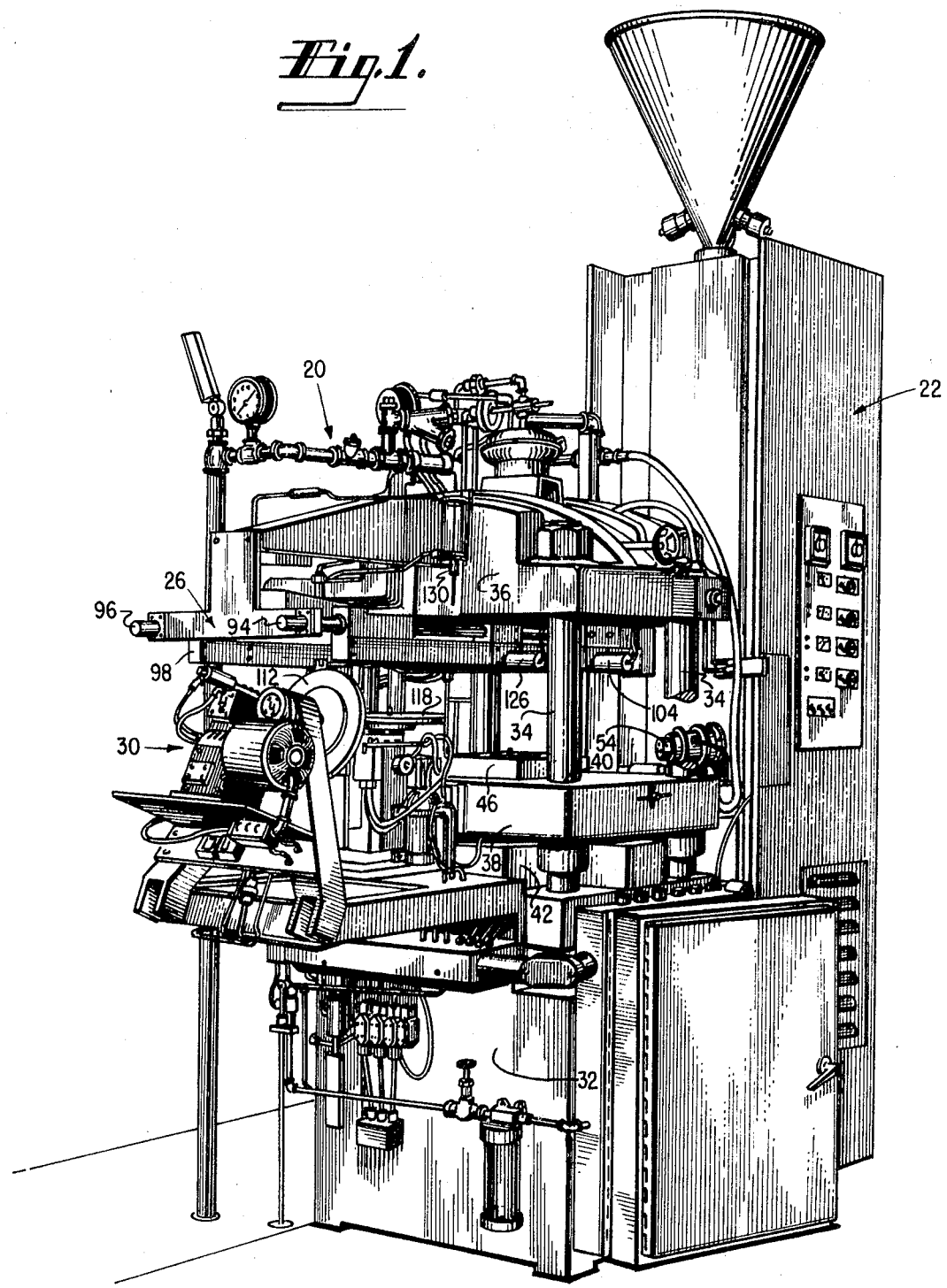
FIG. 1 is a perspective view of an embodiment of the automatic press apparatus showing most of the features of the present invention and including a molding press with its platens in an extended open position wherein the interior molding cavity is readily accessible for changing the record stampers.

A detailed description of a preferred embodiment of an automatic record press apparatus constructed in accordance with the present invention will now be given.

Referring to FIGS. 1 and 2, which together provide an overall view of the press apparatus, the press apparatus will be seen to comprise a vertically movable molding press 20, a preform extruder 22, a label loader mechanism 24 operative to position record labels on both sides of a preform, a mechanism 26 for transporting the preform and adhering labels to the molding press and to remove a just molded record from the press, and means 30 for finishing the record and removing the peripheral "flash ring" of excess moldable material surrounding the just molded record received from the press.

MOLDING PRESS

Referring again to FIGS. 1 and 2, the molding press 20 includes a generally rectangular base body portion 32 vertically supporting near each corner thereof a guide post 34. Fixed atop the posts 34 is a rectangularly shaped bolster or upper platen 36. A rectangularly shaped lower platen 38 having a cylindrical opening 40 near each of the four corners thereof and adapted to slide on the respected guide posts 34 is centrally supported on one end of a hydraulically operated piston 42 for reciprocating movement in a vertical direction and parallel to the upper platen 36 as shown diagrammatically in FIGS. 3 and 9. Mounted on the platens 36 and 38 are heat transfer molds 44 and 46 respectively, each mold having passages (not shown) through which steam and cold water may be alternately circulated in carrying out the usual heating and cooling steps in a record molding cycle. Clamped to the upper and lower molds are stampers 48 and 50 respectively (FIG. 4), each sharing the negative of the contours or undulations of the record to be molded.

In FIG. 1, the molding press is shown in its completely open position, i.e., with the piston 42 almost completely recessed into the body portion 32. With the molding press in this position, easy access to the platens is afforded for servicing, such as changing of the stamper plates 48 and 50. During operation, the press platens are either in substantially closed position as when molding a record, or in a normally open or semi-raised position (shown in FIG. 2) as when receiving a moldable material or the preform. However, when first starting up the press for operation from its completely open position, the lower platen 38 is initially caused to move upward to the semi-raised position whereupon chocks (not shown) mounted in the base body portion 32 are caused to move into a suitable position beneath a second group of corner posts (not shown) positioned adjacent the lower ends of the guide posts 34 in supporting relation to the underside of the lower platen 38 so as to limit the downward travel of the lower platen 38 to that shown in FIG. 2. This prevents the press from opening any further than need be to receive a preform-label sandwich (to be hereinafter described) during a cycle of operation, and also reduces the overall operating time of a press cycle thereby minimizing wasted or unnecessary motion. Thus, by virtue of the chocks being slid into a locking position beneath the lower platen 38, the movement of the lower platen is thereafter restricted to a semi-open position (FIG. 2) and a closed position, shown diagrammatically in FIG. 9 wherein the stampers carried between upper and lower platens 36 and 38 engage a preform-label sandwich received therebetween and press the record undulations therein.

THE EXTRUDER

The extruder functions to mix and fuse a composition plastic resin material supplied thereto and thereafter discharge it at a desired molding temperature in metered quantities for transport to the molding press.

More particularly, and with reference now to FIG. 3, a measured quantity of the fused and heated molding material is caused to issue from a nozzle 54 of the extruder 22 into a preform cup 56 pivotally mounted beneath the nozzle 54 on a base frame 58 adjacent the press base 32. The cup 56 serves to shape or preform the moldable material into a paddy, hereinafter referred to as the preform 52.

LABEL LOADER MECHANISM

One of the important features of the present invention is the means for automatically preparing for transfer to the molding press 20 a measured quantity of the preform compound 52 aligned and sandwiched between a pair of record labels.

Referring now to FIGS. 3 through 8 of the drawings, the preform cup 56 is formed by two semi-circular half ring sections 60 and 62 pivotally connected at one end and which in closed position form an annulus of suitable depth and inside diameter dimensions for holding a premeasured quantity of the moldable material. After filling with the moldable material and in response to a sequenced control signal during an operating cycle of the press apparatus, the closed cup 56 is caused to pivot laterally along the top surface of the base frame 58 to a position in line with an opening 64 in the base frame 58.

The record bottom labels (hereinafter referred to as the "A" labels) are stored on a spindle 66 centrally positioned within a lower cylindrical magazine 68. The spindle 66 projects slightly from the end opening 70 in the magazine and has a diameter slightly smaller than the center holes of the "A" labels which it is designed to hold. Suitable means (not shown) are provided for biasing a stack of "A" labels against the end lip or flange 72 of the magazine 68. The magazine itself is supported on a rod 74 mounted for reciprocating motion through the opening 64 in the base frame 58 and in vertical alignment with an upper magazine assembly storing the top record label (hereinafter referred to as the "B" label) next to be described.

The upper magazine assembly is structurally similar to the lower or "A" label magazine assembly and includes an upper cylindrical magazine 76 for storing a stack of "B" labels, a spindle 78 positioned within the magazine 76 and having a diameter slightly smaller than the diameter of the center holes of the "B" labels such that the spindle is loosely received through the center holes of the "B" labels and projects slightly out from the end opening in the magazine. Suitable means (not shown) are provided for biasing a stack of "B" labels against the peripheral end flange 80 of the magazine 76. The upper magazine 76 is mounted for reciprocating movement in a vertical direction and in alignment with the lower magazine 68. As shown more particularly in FIG. 4, two studs 82 and 84 depend from the peripheral edge of the upper magazine flange 80 so as to be received in mating apertures 86 and 88 respectively in the lower magazine flange 72 during opposing movement of the two magazines thereby to insure precise vertical alignment between the two magazines and provide for consistently uniform centering of the "A" and "B" labels on opposite sides of a preform 52 received therebetween during an operating cycle of the press apparatus.

Operation of the label loader mechanism 24 is as follows. Prior to the moldable material filled cup 56 pivoting to a position in line with the label storing magazines 68 and 76, both of the magazines 68 and 76 are in a fully retracted position as shown diagrammatically in FIG. 3. Thereafter, the cup 56 is caused to pivot laterally to a position in line with the base frame opening 64 and central to the projecting spindle 66. The lower magazine is then caused to move upward until the projecting spindle 66 pierces the preform 52 held in the cup 56. The cup then opens leaving the preform 52 on the spindle 66 and the backside of the exposed uppermost "A" label 90, afterwhich, the lower magazine returns to its fully retracted position. The cup then pivots back to its rest position beneath the extruder nozzle 54, and there closes to form an annulus to receive the next quantity of moldable material. The lower magazine now carrying the preform 52 is then caused to move upward to meet the now descending upper magazine 76 (see FIG. 4) whereupon the two studs 82 and 84 on the upper magazine 76 are received in the mating apertures 86 and 88, respectively, in the lower magazine 68 and the preform 52 is sandwiched between the backside of the uppermost "A" label 90 and the backside of the lowermost "B" label 92 with sufficient pressure to cause the labels 92 and 90 to adhere to the respective top and bottom surfaces of the preform 52.

PREFORM-LABEL SANDWICH TRANSPORTING AND RECORD REMOVAL MECHANISM

To transport the preform-label sandwich 28 to the press apparatus and a just molded record from the press apparatus, a moving carriage assembly 26 is provided. The assembly is shown diagrammatically in FIG. 3. It includes a pair of horizontally disposed parallel support rods or bars 94 and 96. A frame-like carriage member 98 straddles the rods 94 and 96 and is carried thereon for reciprocating movement in a horizontal direction during an operating cycle of the press apparatus. To transport the preform-label sandwich to a molding position between the press platens 36 and 38, two preform grippers 100 and 102 mounted near one end of the carriage 26 extend inwardly toward the preform-label sandwich in horizontal alignment therewith so as to be extendable thereto to grasp the sandwich for transporting it to the press apparatus. The grippers are normally spring biased in an outward or retracted position and are caused to move inwardly toward the preform-label sandwich by means of pneumatically controlled cylinders 104 and 106 positioned outside the carriage assembly in coupling relation to the grippers 100 and 102 as shown diagrammatically in FIG. 4. Thus, during a record molding cycle of operation, when the respective upper and lower magazines 76 and 68 reach their extended positions and a preform-label sandwich is formed, the preform grippers 100 and 102 under the influence of the respective pneumatic cylinders 104 and 106 are caused to be extended inwardly to latch into a forward position and to penetrate the preform itself and thereby securely grasp the preform-label sandwich 28. This penetration of the sandwich by the grippers 100 and 102 is shown in cross section in FIG. 6. Thereafter, the upper and lower label magazines 76 and 68 are caused to retract from the grasped sandwich 28, thereby leaving the uppermost "A" label 90 and lowermost "B" label 92 adhering to the preform 52. Structural details of a gripping member suitable for use in the described apparatus are shown in FIGS. 7 and 8.

Referring now to FIGS. 9, 10 and 11, a second pair of opposing gripping members 108 and 110, hereinafter referred to as the flash grippers, are seen to be supported by and extend inwardly from the carriage frame member 98, said flash grippers 108 and 110 being spaced from and parallel to the preform grippers 100 and 102. During a record pressing cycle with the press platens substantially closed, the flash grippers 108 and 110 are positioned between the press platens 36 and 38 and under the influence of pneumatically operated control means 126 and 128 are caused to clamp against a "flash ring" which forms from excess moldable material and surrounds the periphery of the pressed record, while the preform grippers 100 and 102 are in position to grasp a newly assembled preform-label sandwich and ready it for transport to the molding press 20.

When the press platens 36 and 38 open, the carriage frame 98 is caused to shift laterally along the rods 94 and 96 and carry the preform-label sandwich to a position between the open press platens. During the same carriage frame movement, a just molded record 111 is carried out from between the press platens by the flash grippers 108 and 110 which have clamped against the "flash ring" 113 of the record. A perspective partial view showing the flash grippers 108 and 110 in clamped engagement with the "flash ring" surrounding a just molded record is shown in FIG. 12. One of the flash grippers is shown in side and top elevation views respectively in FIGS. 13 and 14.

RECORD FINISHING APPARATUS

In FIGS. 10 and 11, the record edging and flash cutting mechanisms forming part of the fully automatic press apparatus of the invention are diagrammatically illustrated. The apparatus includes a "B" turntable 112 angled downwardly as shown and coupled to a motor drive mechanism 114 for circular rotation, a flash cutter knife and edge trimmer 116 positioned proximate the rim edge of said "B" turntable and movable to cut through and thereafter trim the "flash ring" of material from a just molded record pressed against said "B" turntable and rotated therewith, and an "A" turntable 118 supported on an elevating mechanism designated generally by the number 120 and operable in sequence to first raise said "A" turntable to a supporting position beneath a just molded record withdrawn from between the press platens so as to receive the record thereon, then lower to a position slightly beneath the plane of said "B" turntable and pivot outwardly so as to face in the direction of said "B" turntable and then elevate thereto so as to cause said received just molded record to be sandwiched against the exposed flat surface of said "B" turntable.

Continuing now with the sequenced operation of the automatic press apparatus during a cycle of operation, after opening of the press platens 36 and 38 and the transfer out of a just molded record, and the transfer in to a position between the press platens 36 and 38 of a preform-label sandwich, the press platens 36 and 38 are caused to partially close so as to press against and firmly secure the preform-label sandwich in a fixed central molding position therebetween with central spindle projections 136 and 138 in the molds 44 and 46 being respectively received in spindle holes in the "A" and "B" labels affixed to the preform. Simultaneously, pin means 140 and 141 positioned on the lower platen 38 couple to and release the respective latches on the preform grippers 100 and 102, thereby returning them to their outward retracted positions. At the same time, the "A" turntable 118 is caused to elevate to a position to support thereon the just molded record 111 transferred from the press molds with the "A" turntable spindle 122 being received in the spindle hole 124 formed in the just molded record by the spindle projections 136 and 138 in the press molds 44 and 46.

Continuing with the sequenced operation of the automatic press apparatus during a cycle of operation, pneumatically operated control means 130 and 132 are caused to couple to and actuate the flash grippers 108 and 110 respectively in a manner to cause the flash grippers 108 and 110 to open and release or disengage themselves from the flash ring leaving the just molded record supported on the "A" turntable 118. The carriage frame member 98 is then caused to shift laterally back to the first position so as to bring the preform grippers 100 and 102 to a position to engage a preform-label sandwich to be formed during the next molding cycle of operation; while the flash grippers 108 and 110 are brought between the press platens 36 and 38 to a position to grasp and sandwich within its jaws the flash ring of excess molding material formed during the molding of a record from the preform-label sandwich now between the press platens. Under the influence of the hydraulically operated piston 42, the press platens then close to press the information undulations of the stampers 48 and 50 into the preform received therebetween and mold a record. It will be understood that each of the molds 44 and 46 contain therein the requisite passages (not shown) through which steam and cold water may be alternately circulated in carrying out the usual heating and cooling steps in a record molding cycle. For simplicity and clarity in the drawings, the connections and means for bringing the steam and water services to the press apparatus have not been detailed, since the teachings thereof are well known in the art.

The "A" turntable 118, now carrying the just molded record 111 is caused to lower to a position slightly beneath the plane of the "B" turntable 112, tilt outwardly to face the "B" turntable 112, and then elevate toward the "B" turntable to bring the just molded record into engagement with the exposed flat surface 134 of the "B" turntable. The flash cutter and edge trimmer means 116 is then caused to move radially in towards the "A" and "B" turntables and record sandwich, cut the flash 113 and thereafter trim the flash ring 113 from the periphery of the record upon rotation of the record turntable sandwich. Upon completion of the trimming operation, the "A" turntable is caused to retract from the "B" turntable, and the finished record is thereafter allowed to drop under the influence of gravity to be received in a storage means (not shown) positioned therebeneath whereupon the record is now ready to be packaged and marketed.

In the above-described label loading and record press molding cycle operation, it will be apparent that the molding press is only open and therefore not pressing a record, during the relatively short interval that a preform-label sandwich is transported to a position between the press platens, and simultaneously therewith, a just molded record is transported out from between said press platens. Thus, the overall operating time of the press cycle of operation is reduced to its barest minimum thereby providing an increased manufacturing efficiency.

It will be understood that in the embodiment illustrated, the means for actuating or effecting the sequenced movement of the described structure may take the form of pneumatically controlled pistons as is the case for the preform and flash gripper actuating cylinders 104, 106, 126, 128, 130, and 132, or other devices such as limit switches, air valves, relays, hydraulic means, motorized drives, etc. (not shown) as well as other motion and control means as may suggest themselves to those skilled in the art and wherein the operation and implementation thereof to the structural apparatus described hereinabove is well known in the art.

It will be further understood that in the above-described embodiment, each of the structures described performs its function in response to the previous action(s) of another structure, and/or under the timed control of a timing mechanism (not shown) and of conventional type. For example, one such timing mechanism may comprise a drum carrying a series of paralel grooves having cam segments fixed thereon of predetermined and varying length. Upon the cam segments of each track may ride a cam follower connected to a shaft carrying a valve closure member. As the drum rotates, driven by an electric motor, the cam followers are raised and lowered in a predetermined sequence, thus opening or closing corresponding valves opening into a manifold for the selective channeling of air, water, steam or other services to actuate or move the various functioning assemblies, switches, and controls comprising the described automatic press apparatus.

What is claimed is:

1. In an apparatus for the automated production of phonograph records, said apparatus having a molding press including two opposing platen members and adapted to press a disc record from a quantity of moldable material received therein, the improvement comprising:

means for assembling for transport to said molding press a sandwich arrangement comprising a measured quantity of moldable material having adhering thereto on opposing surface areas a top and bottom record label, said assembling means including a pair of spaced apart vertically oriented and axially aligned magazines for respectively housing a quantity of said top and bottom record labels, opposing ends of said magazines being open for removal of record labels therefrom;

means for depositing a quantity of heated moldable material between said magazines;

first transport means first movable to grasp said moldable material and thereafter movable to transport said moldable material and adhering record labels to said molding press for molding a record disc therefrom; and means mounting said magazines for reciprocating movement, first toward one another so as to cause an exposed record label from the open end of each of said magazines to be pressed against opposing surface areas of said moldable material, thereby to cause said labels to adhere to said moldable material and form a record-label sandwich therewith, and second, after said first transport means moves into engaging contact with said moldable material, said magazines being caused to move away from one another, thereby to leave said record-label sandwich supported by said first transport means.

2. In an apparatus as defined in claim 1:

second transport means first movable to a position within said molding press and between said platen members so as to grasp a flash ring of excess moldable material formed during the molding of a record, and thereafter movable to a position exterior of said molding press for transporting thereto a just molded record.

3. In an apparatus as defined in claim 2:

a carriage assembly supporting said first and second transport means such that when said first transport means is engaging contact with said moldable material, said second transport means is positioned within said press platens, and when said first transport means is caused to move to a position between said press platens, said second transport means is caused to move to a position exterior of said molding press.

4. In an apparatus for the automated production of phonograph records, said apparatus having molding press including two opposing platen members and adapted to press a disc record from a quantity of moldable material received therein, the improvement comprising:

means for assembling a sandwich arrangement including a top and bottom title label adhering in axial alignment with one another to opposing surfaces of a quantity of moldable material, said assembling means including a pair of spaced apart vertically oriented and axially aligned magazines for respectively housing a quantity of said top and bottom title labels, opposing ends of said magazines being open for removal of title labels therefrom;

means for depositing a quantity of heated moldable material between said magazines;

first transport means first movable into engaging contact with said moldable material and thereafter movable to transport said sandwich arrangement to said molding press and between said press platens for molding a record disc therefrom; and means mounting said magazines for reciprocating movement, first toward one another so as to cause a title label from the open end of each of said magazines to be pressed against opposing surface areas of said moldable material, thereby to cause said labels to adhere to said moldable material and form a title label sandwich therewith, and second, after said first transport means moves into engaging contact with said moldable material, said magazines being caused to move away from one another, thereby to leave said title label sandwich supported by said first transport means.

5. An apparatus as defined in claim 4 wherein said first transport means includes a carriage mounted for reciprocating movement in a horizontal plane toward and away from said press platens, two gripping members carried on said carriage members in opposing relationship to one another so as to extend inwardly toward and in horizontal alignment with a formed sandwich arrangement, said gripping members being movable in a direction to engage and grasp the moldable material portion of said sandwich arrangement.

6. In an apparatus as defined in claim 5:

second transport means carried by said carriage member and first movable to a position within said molding press and between said platen members so as to grasp a flash ring of excess moldable material formed during the molding of a record, and thereafter movable to a position exterior of said molding press for transporting thereto a just molded record, the first and second movements of said second transport means being respectively coincidental with the first and second movements of said first transport means.

7. Apparatus as defined in claim 4 wherein said pair of vertically oriented and axially aligned magazines each include a spindle which projects through center holes in the labels stored in said magazines and extends beyond the open end of said magazine such that when said mounting means is positioned so that said magazines are fully reciprocated toward one another, the extending tip of each of said magazine spindles extends into said moldable material to form a hole therein.

8. Apparatus as defined in claim 7 wherein said first transfer means includes two grasping members mounted for movement in a horizontal plane, said grasping members movable to pierce said moldable material to securely support said sandwich arrangement for transport.

9. Apparatus as defined in claim 8 wherein said molding press includes a pair of vertically oriented and axially aligned spindle projections positioned to be in axial alignment with the holes in said moldable material when said moldable material has been transported by said first transport means to said press.

10. Apparatus as defined in claim 9 wherein said means for depositing is mounted to be moved into and out of the path of reciprocating movement of said pair of vertically oriented and axially aligned magazines and said mounting means is operable to first move the lower one of said pair of vertically oriented and axially aligned magazines upwardly toward said means for depositing to support and to press against moldable material deposited by said means for depositing and thereafter downwardly away from said means for depositing to permit said means for depositing to be moved out of said path of reciprocating movement of said vertically oriented and axially aligned magazines and second to move the lower magazine supporting said moldable material and the upper one of said pair of vertically oriented and axially aligned magazines toward one another to cause the upper magazine to press against said moldable material.

11. A process for the production of phonograph records including the steps of:
depositing a quantity of moldable material between an upper and a lower spaced apart vertically oriented and axially aligned magazines, said magazines each housing, respectively, a quantity of upper and lower record labels, opposing ends of said magazines being opened for removal of labels therefrom;
reciprocating said magazines to move toward one another so as to cause an exposed record label from the open end of each of said magazines to be pressed against opposing surface areas of said moldable material, thereby to cause said labels to adhere to said moldable material and form a record label sandwich therewith;
grasping said moldable material to support said sandwich;
reciprocating said magazines to move away from one another and out of contact with said record label sandwich; and
moving the grasped moldable material and adhering labels to a molding press to position said record label sandwich in position for molding a record disc therefrom.

12. A process for the production of phonograph records as defined in claim 11 wherein said upper and lower spaced apart vertically oriented and axially aligned magazines reciprocate with the lower one of said magazines first moving upwardly to engage and support said moldable material and thereafter the upper one of said magazines moving downwardly to engage said moldable material.

13. A process for the production of phonograph records as defined in claim 12 wherein each of said pair of spaced apart vertically oriented and axially aligned magazines includes a spindle which projects through center holes in the labels stored in said magazines and extends beyond the open end of said magazine, and including the step of piercing top and bottom portions of said moldable material with the spindles of said magazines when said magazines reciprocate to engage said moldable material such that an upper and a lower hole is formed in said moldable material.

14. A process for the production of phonograph records as defined in claim 13 wherein said molding press includes a pair of vertically oriented and axially aligned upper and lower spindle projections and including the step of closing said molding press to cause said upper and lower spindle projections to protrude, respectively, through the center hole in the upper and lower record label and into the upper and lower hole in said moldable material formed by said magazine spindles.

15. A process for the production of phonograph records as defined in claim 14 wherein said moldable material is grasped by a gripper means having first and second members and wherein said grasping step includes moving said first and said second members to penetrate said moldable material intermediate the upper and lower hole in said moldable material formed by said magazine spindles to thereby securely grasp said record label sandwich.

16. A process as defined in claim 15 wherein said press includes platen members and including the further step of moving transfer means within said molding press and between said platen members to grasp a flash ring of excess moldable material formed during the molding of a record; and said transfer means thereafter moving said molded record and excess moldable material to a position exterior of said molding press.

17. A process for molding records as defined in claim 16 including a carriage assembly supporting said gripper means and said transfer means and including the further step of moving said carriage assembly such that when said gripper means is in engaging contact with said moldable material, said transfer means is positioned within said press platens, and when said gripper means is positioned between said press platens, said transfer means is positioned exterior of said molding press.

References Cited
UNITED STATES PATENTS

| | | | |
|---|---|---|---|
| 2,743,478 | 5/1956 | Harlow et al. | 18—5.3 P |
| 3,113,905 | 12/1963 | Rosen | 18—5.3 UX |
| 3,186,029 | 6/1965 | Joseph | 18—5.3 P |
| 3,329,997 | 7/1967 | Rand et al. | 18—5.3 P |
| 3,412,427 | 11/1968 | Flusfeder et al. | 18—5.3 P |
| 3,528,127 | 9/1970 | Damm et al. | 18—5.3 P |
| 3,526,690 | 9/1970 | Bachman | 18.—5.3 PX |

J. HOWARD FLINT, JR., Primary Examiner

U.S. Cl. X.R.

18—5.3 P

UNITED STATES PATENT OFFICE
CERTIFICATE OF CORRECTION

Patent No. 3,662,051          Dated May 9, 1972

Inventor(s) Loraine C. Harlow, Stephen D. Ransburg, and Lester L. Mehaffey

It is certified that error appears in the above-identified patent and that said Letters Patent are hereby corrected as shown below:

In Column 7, line 21, "paralel" should read -- parallel --.
Column 8, line 46, after "carriage" insert -- member --.

Signed and sealed this 26th day of December 1972.

(SEAL)
Attest:

EDWARD M. FLETCHER, JR.
Attesting Officer

ROBERT GOTTSCHALK
Commissioner of Patents